March 4, 1958
F. R. LOFTHOUSE
2,825,238
DUAL CONTROL FOR ENGINE GOVERNOR
Filed Sept. 13, 1954
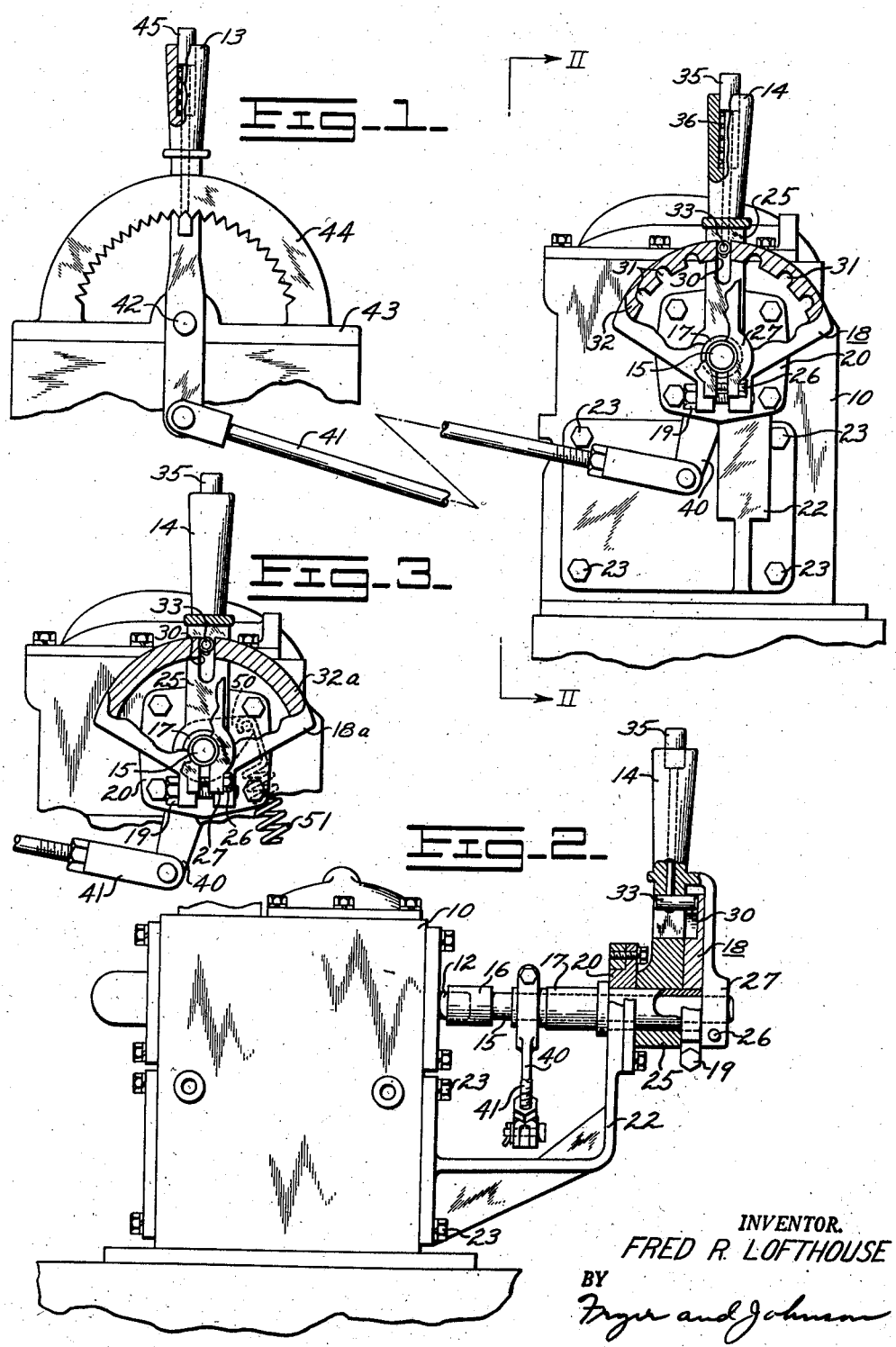
INVENTOR.
FRED R. LOFTHOUSE
BY
Fryer and Johnson
ATTORNEYS

United States Patent Office 2,825,238
Patented Mar. 4, 1958

2,825,238

DUAL CONTROL FOR ENGINE GOVERNOR

Fred R. Lofthouse, Pekin, Ill., assignor to Caterpillar Tractor Co., Peoria, Ill., a corporation of California Application September 13, 1954, Serial No. 455,479

4 Claims. (Cl. 74—480)

This invention relates to dual control mechanisms and particularly to controls remotely situated for actuating a single adjustable part.

The mechanism herein disclosed is shown in a form adaptable for use in connection with the governor or other speed control device of an internal combustion engine, but its adaptability to various other adjustable parts will be recognized as the description proceeds.

In many engine installations, such as in boats or locomotives, it is common practice to provide controls which permit adjustment of the speed of the engine either from the engine room or from the operator's station such as the cab or pilot house remote from the engine. Relatively complex fluid or electrically actuated controls have been used for this purpose, but are undesirable because of their original costs and their intricate nature.

It is an object of the present invention to provide a mechanical dual control mechanism which permits a full range of adjustment of the part to be controlled from either of two remotely positioned stations. It is a further object to provide a mechanical dual control in which separate control levers are latched in any position of adjustment but may be operated to obtain a full range of adjustment notwithstanding the fact that they are occasionally latched in different phased positions. Further and more specific objects and advantages of the invention will be made apparent in the following specification wherein reference is made to the accompanying drawings.

In the drawings:

Fig. 1 is a schematic view in elevation and with parts in section of a dual control mechanism embodying the present invention;

Fig. 2 is a view of the control mechanism taken along the line II—II of Fig. 1, and with parts in section and;

Fig. 3 is a partial view in elevation and with parts in section of a modification of the control of the present invention.

The principal parts of the mechanism to be controlled are incased in a housing 10 from which projects a short shaft 12 (see Fig. 2) adapted to be connected with a part to be adjusted for control. The shaft 12 is adapted to effect adjustment of the control part either by a remotely positioned lever 13 or by a lever 14 carried adjacent housing 10. According to the present invention, the lever 14 may be locked in any position without respect to the position in which lever 13 is locked so that the levers may be out of phase with respect to each other.

Shaft 12 is non-rotatably secured to a shaft 15 as by a coupling 16. Shaft 15 is supported by and extends through a hollow shaft 17 to which a quadrant 18 is non-rotatably secured as by a clamping bolt 19. Shaft 17 is supported for oscillation in a bearing 20 which in turn is carried in a bracket 22 secured to housing 10 as by capscrews 23.

Lever 14 comprises a bearing portion 25 journalled for oscillation on shaft 17 and a driving portion 27 spaced therefrom and non-rotatably secured to shaft 15 as by clamping bolt 26. The quadrant 18 is disposed between bearing portion 25 and driving portion 27 and is provided with a central slot 30 extending inwardly from the periphery thereof and a plurality of semi-circular recesses 31 formed in flange 32 of quadrant 18 and disposed on either side of said central slot. Recesses 31 are selectively engageable by a locking pin 33 which is supported in lever 14 by a plunger 35 and is urged upwardly into engagement with the central slot or a selected recess by a spring 36.

A lever 40 non-rotatably secured to shaft 17 is connected by a link 41 with lever 13. The link 41 is shown as a single straight link but is intended to be a representation of any suitable linkage for transmitting rocking movement of lever 13 to lever 14. Lever 13 is supported on a pin 42 for rocking movement and this pin is carried by a supporting bracket 43 which also carries a semi-circular toothed quadrant 44 adapted to cooperate with a spring pressed plunger 45 to lock the lever in any desired position of adjustment.

Thus lever 13 may be employed to rock shaft 12 and thus to adjust the member to which it is connected because movement of lever 13 rocks lever 40, hollow shaft 17, quadrant 18, lever 14, and shaft 15 which is non-rotatably secured to said shaft 12. Lever 14 may, however, be employed to rock shaft 15 independently of the setting of lever 13 by depressing plunger 35 to disengage pin 33 from quadrant 18 and thus break the driving connection between lever 14 and said quadrant.

Assuming that levers 13 and 14 are out of phase with respect to each other as might result from operation of lever 14, they may be brought into phase by depressing plunger 35 and re-engaging pin 33 in slot 30, at which time shaft 12 is returned to the angular adjustment indicated by the position of lever 13. Since slot 30 intersects the periphery of quadrant 18, whereas detents 31 limit the movement of pin toward the periphery of the quadrant, the increased outward movement of plunger 35 when pin 33 is engaged in slot 30 provides a visual signal to the operator that the pin is in the central position on the quadrant.

Fig. 3 discloses a modification of the control mechanism wherein lever 13 as before is the basic controlling member and lever 14 is utilized only as an emergency controlling member. For example lever 13 may be the powerhouse control for a compression-ignition propulsion engine governor whereas lever 14 is an emergency controlling lever adjacent the engine. In the modification shown, rocking of a lever 50, which is non-rotatably secured to shaft 12, in a counterclockwise direction to advance the engine rackbar (not shown) is opposed by the governor spring 51. The lever 50 and spring 51 are parts of a conventional governor contained within the housing 10. In the event of an emergency, plunger 35 is depressed to disengage pin 33 from quadrant 18a and lever 14 can be rocked in a clockwise direction independently of lever 13 to retard the engine fuel rack toward shutdown. Since no recesses are provided on flange 32a, except for the central slot 30, levers 13 and 14 may be synchronized by rocking lever 14 in a counter-clockwise direction until pin 33 indexes with slot 30 at which time spring 36 will urge the pin upwardly and lock lever 14 to quadrant 18a.

If an emergency requires instantaneous acceleration of the engine from the engine room, lever 14 can be operated independently of lever 13 as previously described but in a counter-clockwise direction. Upon release of lever 14, after such acceleration, the governor spring 51 will automatically rock lever 14 in a clockwise direction until slot 30 again indexes with pin 33 to synchronize levers 13 and 14.

I claim:

1. In a dual control comprising a driven member, a first driving shaft, a second driving shaft extending through and supported for relative rocking movement in the first driving shaft and connected to the driven member, manually operable control means for each of said driving shafts, releasable locking means associated with the control means for said first driving shaft to release it from the shaft, a second releasable locking means between the first and second shafts for transmitting torque from said first driving shaft to the driven member, and means for disengaging said locking means and transmitting torque from said second driving shaft to the driven shaft independently of the first driving shaft.

2. In a dual control comprising a driven member, a first driving shaft, a second driving shaft extending through and supported for relative rocking movement in the first driving shaft, manually operable control means for each of said driving shafts, releasable locking means associated with the control means for said first driving shaft, a semi-circular flange on the first driving shaft having an internally recessed surface, a second releasable locking means associated with the second driving shaft normally resiliently urged into engagement with said internally recessed surface to transmit torque from the first driving shaft to the driven member through said second driving shaft and means for disengaging said locking means from the first driving shaft and transmitting torque from the second driving shaft to the driven member independently of said first driving shaft.

3. In a dual control for an engine or the like which has a fuel control mechanism with a rotatable element for adjusting fuel supply, a shaft connected to said element, a hollow shaft surrounding said connected shaft, a first control lever rotatable on the hollow shaft, a driving connection between said lever and the connected shaft, a second control lever connected to the hollow shaft, and a releasable connection between the first control lever and the hollow shaft whereby the first control lever may rotate the connected shaft without moving the second control lever.

4. In a dual control for an engine or the like which has a fuel control mechanism with a rotatable element for adjusting fuel supply, a shaft connected to said element, a hollow shaft surrounding said connected shaft, a first control lever rotatable on the hollow shaft, a driving connection between said lever and the connected shaft, a second control lever connected to the hollow shaft, and a releasable connection comprising a quadrant having detents cooperating with a locking pin acting between the first control lever and the hollow shaft whereby the first control lever may rotate the connected shaft without moving the second control lever, and wherein said quadrant has a central slot for receiving said locking pin thereby locking said first control for manipulation by said second control lever.

References Cited in the file of this patent

UNITED STATES PATENTS

| | | |
|---|---|---|
| 393,707 | Kerns | Nov. 27, 1888 |
| 2,124,756 | Staples | July 26, 1938 |
| 2,660,902 | Wagner | Dec. 1, 1953 |